United States Patent
Abbott et al.

(10) Patent No.: US 12,485,524 B2
(45) Date of Patent: Dec. 2, 2025

(54) ANTI BIND-UP CONTROL FOR POWER TOOLS

(71) Applicant: MILWAUKEE ELECTRIC TOOL CORPORATION, Brookfield, WI (US)

(72) Inventors: Jonathan E. Abbott, Milwaukee, WI (US); Maxwell L. Merget, Whitefish Bay, WI (US); Carter H. Ypma, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/543,543

(22) Filed: Dec. 18, 2023

(65) Prior Publication Data

US 2024/0123596 A1    Apr. 18, 2024

Related U.S. Application Data

(63) Continuation of application No. 17/502,214, filed on Oct. 15, 2021, now Pat. No. 11,845,173.
(Continued)

(51) Int. Cl.
*B25F 5/00* (2006.01)
*B25F 5/02* (2006.01)
(Continued)

(52) U.S. Cl.
CPC .......... *B25F 5/001* (2013.01); *H02K 11/0094* (2013.01); *H02K 11/33* (2016.01); *B25F 5/02* (2013.01)

(58) Field of Classification Search
CPC .......... B25F 5/02; B25F 5/001; H02K 11/33; H02K 11/0094
See application file for complete search history.

(56) References Cited

U.S. PATENT DOCUMENTS

| | | |
|---|---|---|
| 5,142,210 A | 8/1992 | Kojima et al. |
| 5,401,124 A | 3/1995 | Hettich |

(Continued)

FOREIGN PATENT DOCUMENTS

| | | |
|---|---|---|
| CN | 103386665 A | 11/2013 |
| DE | 202011110069 U1 | 2/2013 |

(Continued)

OTHER PUBLICATIONS

International Search Report and Written Opinion for Application No. PCT/US2021/055135 dated Feb. 4, 2022 (10 pages).

(Continued)

*Primary Examiner* — Daniel Jeremy Leeds
(74) *Attorney, Agent, or Firm* — Michael Best & Friedrich LLP

(57) ABSTRACT

Systems and methods for detecting and acting on bind-up conditions of a power tool. The power tool includes a housing, a motor, a battery pack, and a motion sensor configured to sense rotational motion of the housing. An electronic controller is connected to the motor, the battery pack, and the motion sensor. The electronic controller is configured to determine whether a battery fetting event is occurring and adjust a rotational motion threshold used to determine a bind-up event based on the battery fetting event. The electronic controller is further configured to receive, from the motion sensor, a first signal associated with a rotational motion of the housing, compare a value based on the signal to the rotational motion threshold, and initiate, in response to the value being greater than or equal to the rotational motion threshold, a protective operation.

20 Claims, 14 Drawing Sheets

Related U.S. Application Data

(60) Provisional application No. 63/092,946, filed on Oct. 16, 2020.

(51) Int. Cl.
 *H02K 11/00* (2016.01)
 *H02K 11/33* (2016.01)

(56) References Cited

U.S. PATENT DOCUMENTS

| | | | |
|---|---|---|---|
| 5,704,435 | A | 1/1998 | Meyer et al. |
| 5,879,111 | A | 3/1999 | Stock et al. |
| 5,914,882 | A | 6/1999 | Yeghiazarians |
| 5,954,457 | A | 9/1999 | Stock et al. |
| 5,984,020 | A | 11/1999 | Meyer et al. |
| 6,111,515 | A | 8/2000 | Schaer et al. |
| 6,236,177 | B1 | 5/2001 | Zick et al. |
| 6,843,140 | B2 | 1/2005 | Osselmann et al. |
| 7,055,620 | B2 | 6/2006 | Nadig et al. |
| 7,395,871 | B2 | 7/2008 | Carrier et al. |
| 7,410,006 | B2 | 8/2008 | Zhang et al. |
| 7,487,845 | B2 | 2/2009 | Carrier et al. |
| 7,497,272 | B2 | 3/2009 | Strasser et al. |
| 7,506,694 | B2 | 3/2009 | Stirm et al. |
| 7,552,781 | B2 | 6/2009 | Zhang et al. |
| 7,681,659 | B2 | 3/2010 | Zhang et al. |
| 7,730,963 | B2 | 6/2010 | Carrier et al. |
| 7,938,194 | B2 | 5/2011 | Carrier et al. |
| 8,317,350 | B2 | 11/2012 | Friedman et al. |
| 8,328,381 | B2 | 12/2012 | Dixon et al. |
| RE44,311 | E | 6/2013 | Zhang et al. |
| 8,506,108 | B2 | 8/2013 | Friedman et al. |
| 8,555,997 | B2 | 10/2013 | Carrier et al. |
| 8,561,715 | B2 | 10/2013 | Gut et al. |
| RE44,993 | E | 7/2014 | Vanko et al. |
| RE45,112 | E | 9/2014 | Zhang et al. |
| 8,820,955 | B2 | 9/2014 | Dixon et al. |
| 8,827,483 | B2 | 9/2014 | Dixon et al. |
| 9,028,088 | B2 | 5/2015 | Vanko et al. |
| 9,144,875 | B2 | 9/2015 | Schlesak et al. |
| 9,328,915 | B2 | 5/2016 | Vanko et al. |
| 9,352,456 | B2 | 5/2016 | Murthy et al. |
| 9,352,458 | B2 | 5/2016 | Friedman et al. |
| 9,539,691 | B2 | 1/2017 | Hirschburger |
| 9,644,837 | B2 | 5/2017 | Vanko et al. |
| 9,962,807 | B2 | 5/2018 | Klee et al. |
| 10,144,122 | B2 | 12/2018 | Steurer |
| 10,189,136 | B2 | 1/2019 | Coleman |
| 10,322,502 | B2 | 6/2019 | Wirnitzer et al. |
| 10,326,399 | B2 * | 6/2019 | Hirschburger ......... H02K 7/145 |
| 10,500,707 | B2 | 12/2019 | Hirschburger |
| 10,543,588 | B2 | 1/2020 | Vanko et al. |
| 10,589,413 | B2 | 3/2020 | Goble |
| 10,661,423 | B2 | 5/2020 | Schlegel et al. |
| 10,675,747 | B2 | 6/2020 | Gut et al. |
| 10,953,532 | B2 | 3/2021 | Sunabe et al. |
| 10,981,267 | B2 | 4/2021 | Abbott et al. |
| 11,947,330 | B2 * | 4/2024 | Thompson ........... B23Q 9/0007 |
| 2004/0011632 | A1 | 1/2004 | Hellmann et al. |
| 2008/0021590 | A1 | 1/2008 | Vanko et al. |
| 2008/0319570 | A1 | 12/2008 | Van Schoiack |
| 2010/0257990 | A1 | 10/2010 | Schell et al. |
| 2011/0058356 | A1 | 3/2011 | Friedman et al. |
| 2012/0293096 | A1 | 11/2012 | Mizoguchi et al. |
| 2014/0131059 | A1 | 5/2014 | Verbrugge et al. |
| 2014/0166323 | A1 | 6/2014 | Cooper |
| 2016/0279782 | A1 | 9/2016 | Ullrich et al. |
| 2017/0129089 | A1 | 5/2017 | Manschitz et al. |
| 2018/0043521 | A1 | 2/2018 | Moessnang et al. |
| 2018/0099394 | A1 | 4/2018 | Ichikawa et al. |
| 2018/0099399 | A1 | 4/2018 | Sunabe et al. |
| 2019/0143469 | A1 | 5/2019 | Coleman |
| 2019/0227528 | A1 | 7/2019 | Abbott et al. |
| 2019/0337137 | A1 | 11/2019 | Manschitz et al. |
| 2020/0047321 | A1 | 2/2020 | Heimrich |
| 2020/0114499 | A1 | 4/2020 | Vanko et al. |
| 2020/0114502 | A1 | 4/2020 | Goble |
| 2020/0180132 | A1 | 6/2020 | Schlegel et al. |
| 2020/0189017 | A1 | 6/2020 | Ceroll et al. |
| 2020/0222061 | A1 | 7/2020 | Hines et al. |
| 2021/0078153 | A1 * | 3/2021 | Sunabe ............... H02P 29/0027 |

FOREIGN PATENT DOCUMENTS

| | | |
|---|---|---|
| DE | 102011089343 A1 | 6/2013 |
| DE | 102014219392 A1 | 3/2016 |
| DE | 102015221685 A1 | 5/2017 |
| EP | 1398119 B1 | 4/2010 |
| EP | 3050676 A1 | 8/2016 |
| JP | 2007229888 A | 9/2007 |
| JP | 2020049637 A | 4/2020 |
| WO | 8806508 A2 | 9/1988 |
| WO | 2012000831 A1 | 1/2012 |
| WO | 2019057639 A1 | 3/2019 |
| WO | 2019084280 A1 | 5/2019 |
| WO | 2019141536 A1 | 7/2019 |

OTHER PUBLICATIONS

Extended European Search Report for Application No. 21881155.2 dated May 22, 2024 (9 pages).

* cited by examiner

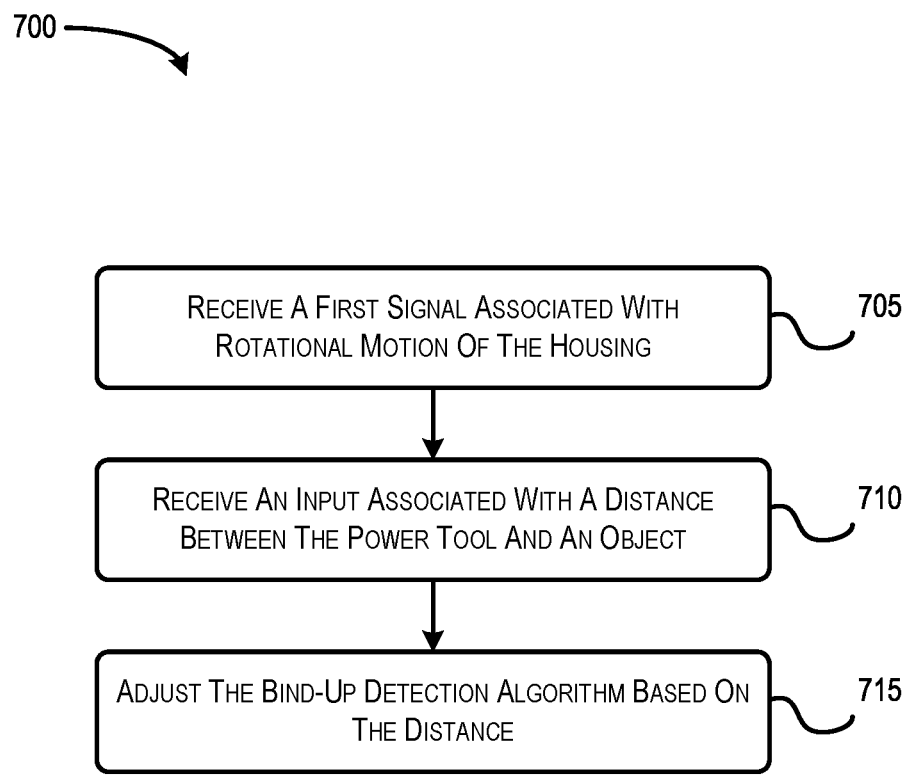

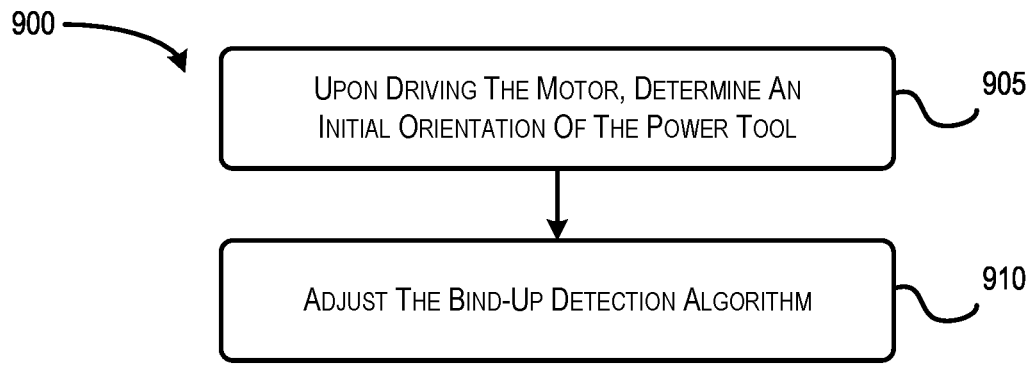
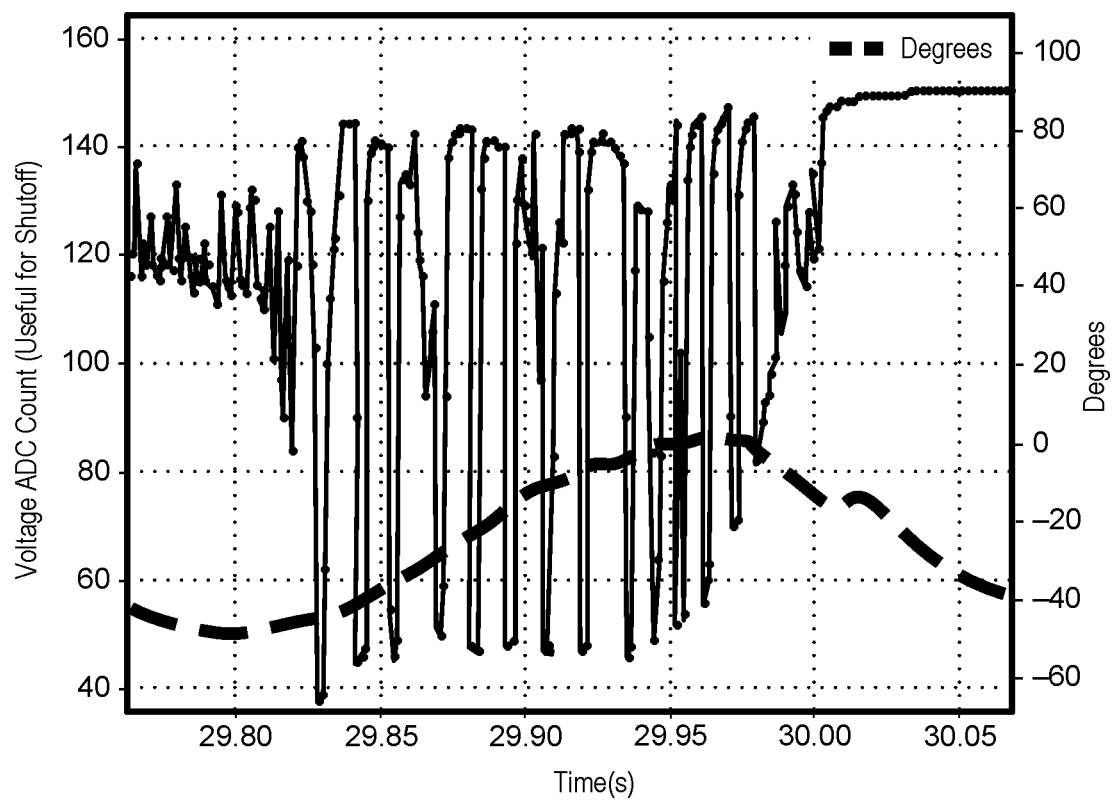

ANTI BIND-UP CONTROL FOR POWER TOOLS

RELATED APPLICATIONS

This application is a continuation of U.S. patent application Ser. No. 17/502,214, filed Oct. 15, 2021, which claims the benefit of U.S. Provisional Patent Application No. 63/092,946, filed Oct. 16, 2020, the entire content of which is hereby incorporated by reference.

SUMMARY

Embodiments described herein provide systems and methods for adjusting a threshold, adjusting a control parameter, and/or switching an algorithm, used to determine a bind-up condition of a power tool or change the control response of the power tool.

Power tools described herein include a housing, a motor within the housing, a battery pack configured to provide current to the motor, and a motion sensor configured to sense a rotational motion of the housing. An electronic controller is connected to the motor, the battery pack and the motion sensor. The electronic controller is configured to determine whether a battery fetting event is occurring and adjust a rotational motion threshold used to determine a bind-up event based on the battery fetting event. The electronic controller is further configured to receive, from the motion sensor, a first signal indicative of rotational motion of the housing, compare a value based on the signal to the rotational motion threshold, and initiate, in response to the value for the signal being greater than or equal to the rotational motion threshold, a first protective operation.

Methods described herein for adjusting a bind-up threshold include receiving an input associated with a distance between a power tool and an object and adjusting a rotational motion threshold used to determine a bind-up event based on the input. The method further includes receiving, from a motion sensor, a first signal indicative of rotational motion of the power tool, comparing a value based on the first signal to the rotational motion threshold, and initiating, in response to the value for the signal being greater than or equal to the rotational motion threshold, a protective operation.

Power tools described herein include a housing, a motor within the housing, a battery pack configured to provide current to the motor, and a motion sensor configured to sense rotational motion of the housing. An electronic controller is connected to the motor, the battery pack, and the motion sensor. The electronic controller is configured to determine whether the power tool is braced against an object and adjust a rotational motion threshold used to determine a bind-up event based on the bracing. The electronic controller is further configured to receive, from the motion sensor, a first signal indicative of rotational motion of the housing, compare a value based on the first signal to the rotational motion threshold, and initiate, in response to the value being greater than or equal to the rotational motion threshold, a protective operation.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

BRIEF DESCRIPTION OF THE DRAWINGS

FIG. 7 illustrates a block diagram of a method of adjusting a bind-up detection algorithm performed by the controller of FIG. 2 in accordance with embodiments described herein.

FIG. 9 illustrates a block diagram of a method of adjusting a bind-up detection algorithm performed by the controller of FIG. 2 in accordance with embodiments described herein.

FIG. 10 illustrates a graph of a protective operation experienced by the power tool of FIG. 1.

DETAILED DESCRIPTION

Figure 1:
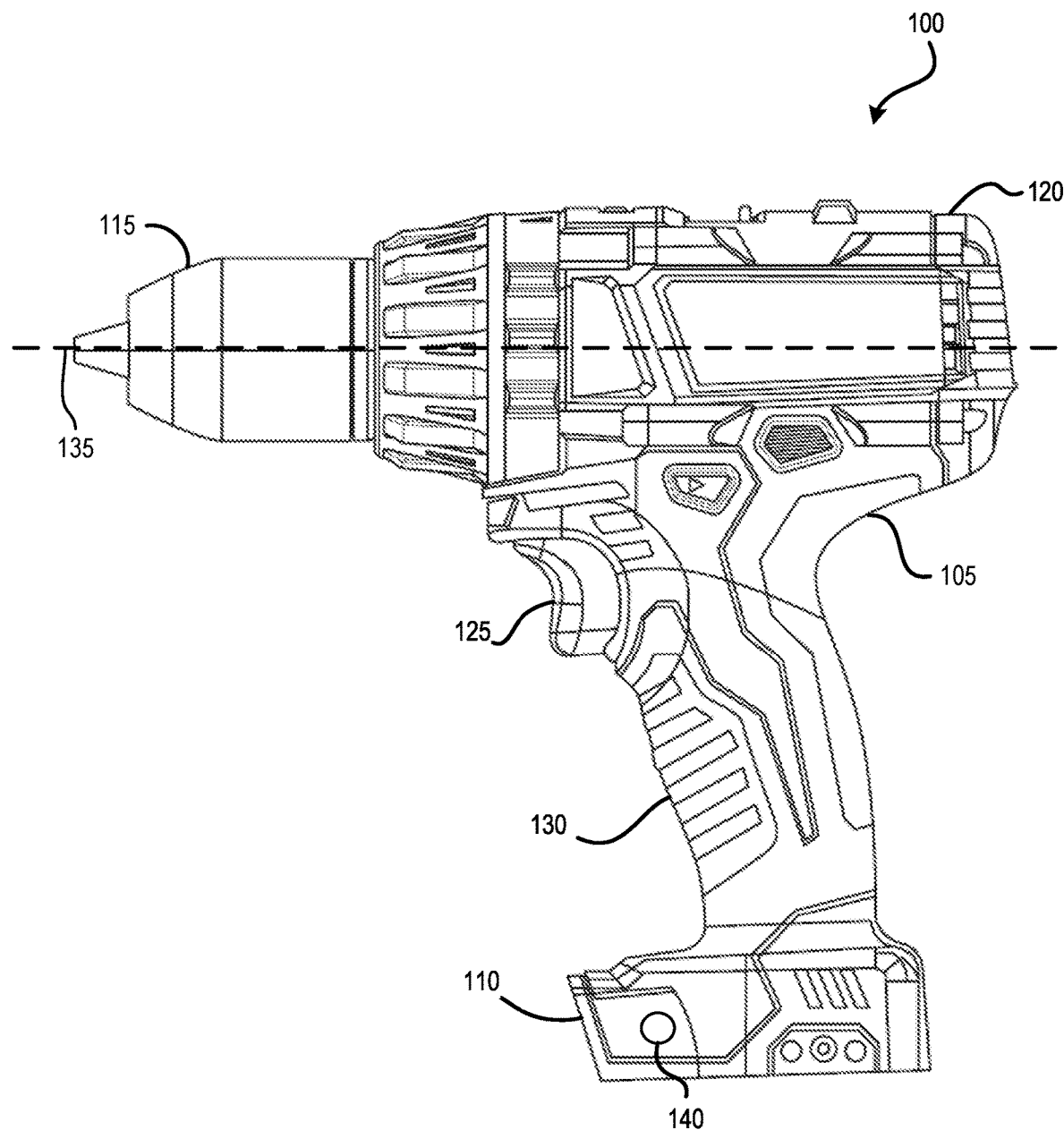
FIG. 1 illustrates a power tool in accordance with embodiments described herein.

FIG. 1 illustrates an example power tool 100, according to some embodiments. The power tool 100 includes a housing 105, a battery pack interface 110, a driver 115 (e.g., a chuck or bit holder), a motor housing 120, a trigger 125, a handle 130, and a proximity sensor 140. The motor housing 120 houses a motor 280 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. The proximity sensor 140 may be configured to detect an object near a side of the power tool 100. For example, the proximity sensor 140 may detect a wall to the left or right side (e.g., perpendicular to the longitudinal axis 135) of the power tool 100. In some embodiments, a proximity sensor 140 is situated on each side of the power tool 100 such that an object is detected regardless of the direction of rotation of the driver 115. In some embodiments, the proximity sensor 140 is a light scanner, a light sensor, a laser, an ultrasound sensor, an infrared (IR) sensor, a pressure sensor, a load sensor, an accelerometer, a camera, or some other sensor capable of detecting an object. In other embodiments, a plurality of load cells may be situated in the handle 130 to detect pressure applied by a user gripping the power tool 100. The plurality of load cells may detect the power tool 100 making contact with an object based on detected shock and/or loading property. While FIG. 1 illustrates a specific power tool 100 with a rotational output, it is contemplated that the anti-bind-up detection methods described herein may be used with multiple types of power tools, such as drills, drivers, powered screw drivers, powered ratchets, grinders, right angle drills, rotary hammers, pipe threaders, or another type of power tool that experiences rotation about the longitudinal axis 135. In some embodiments, the power tool 100 is a power tool that experiences may experience a bind-up that causes a more translational movement to a user, the power tool 100, and/or workpiece, such as reciprocal saws, chainsaws, pole-saws, circular saws, cut-off saws, die-grinder, and table saws. While embodiments described herein primarily refer to monitoring rotational motion and comparing detected motion to rotational motion thresholds, in some embodiments, translational movement of the power tool 100 is monitored and analyzed for detecting bind-up events.

Figure 2:
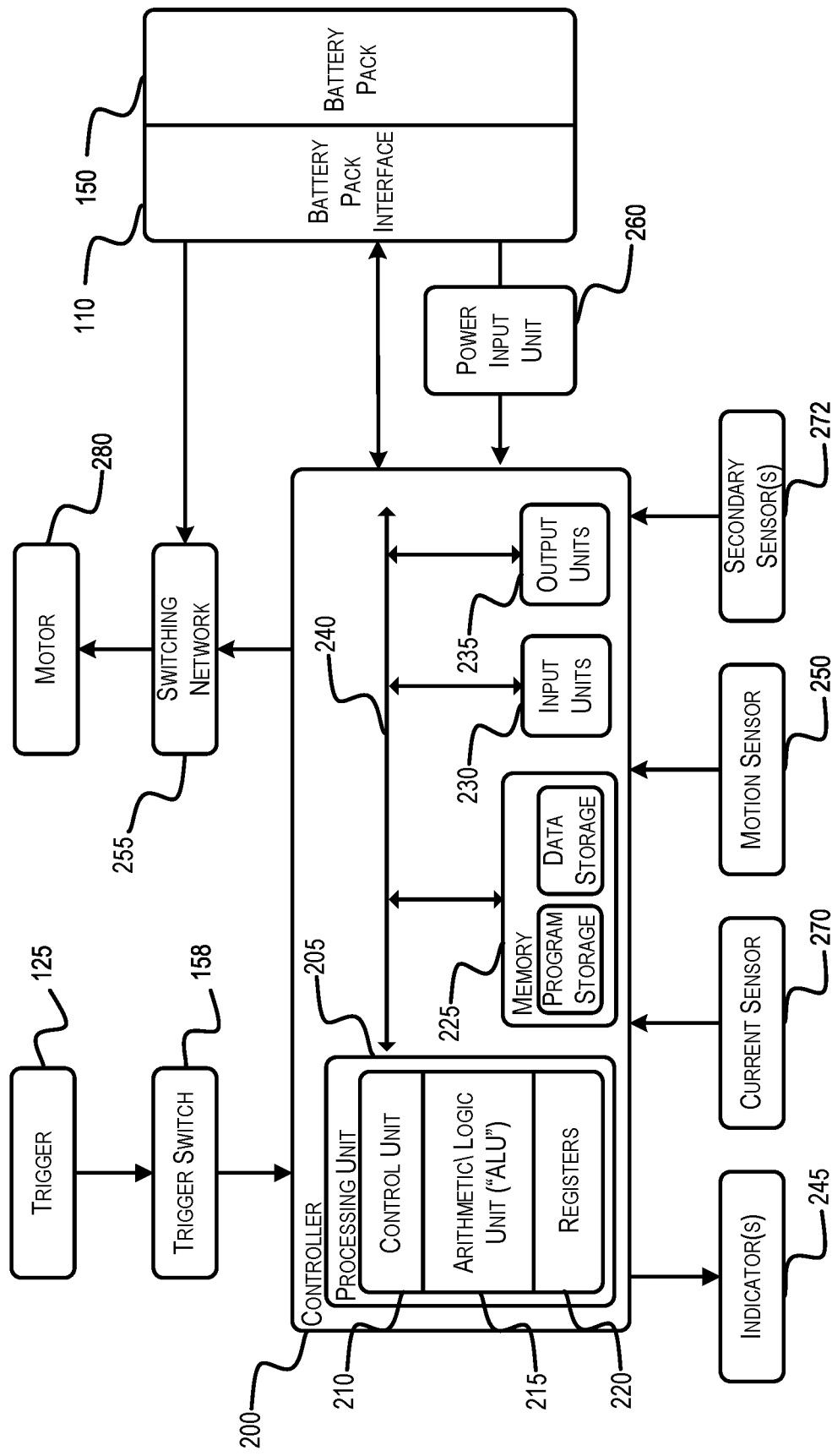
FIG. 2 illustrates a block diagram of a controller for the power tool of FIG. 1 in accordance with embodiments described herein.

A controller 200 for the power tool 100 is illustrated in FIG. 2. The controller 200 is electrically and/or communicatively connected to a variety of modules or components of the power tool 100. For example, the illustrated controller 200 is connected to indicators 245, a motion sensor 250, a current sensor 270, secondary sensor(s) 272 (e.g., a speed sensor, a voltage sensor, a temperature sensor, an accelerometer, the proximity sensor 140, etc.), the trigger 125 (via a trigger switch 158), a power switching network 255, and a power input unit 260.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 280 to rotate driver 115 in response to a user's actuation of the trigger 125. The driver 115 may be coupled to the motor 280 via an output shaft. Depression of the trigger 125 actuates a trigger switch 158, which outputs a signal to the controller 200 to drive the motor 280, and therefore the driver 115. In some embodiments, the controller 200 controls a power switching network 255 (e.g., a FET switching bridge) to drive the motor 280. For example, the power switching network 255 may include a plurality of high side switching elements (e.g., FETs) and a plurality of low side switching element. The controller 200 may control each FET of the plurality of high side switching elements and the plurality of low side switching elements to drive each phase of the motor 280. When the trigger 125 is released, the controller 200 may apply a braking force to the motor 280. For example, the power switching network 255 may be controlled to more quickly deaccelerate the motor 280. In some embodiments, the controller 200 monitors a rotation of the motor 280 (such as, for example, a rotational rate of the motor 280, a position of the motor 280, and the like) via a Hall effect sensor.

The indicators 245 are also connected to the controller 200 and receive control signals from the controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to the charging state of the power tool 100, such as the charging capacity. The indicators 245 may also display information relating to a fault condition, or other abnormality, of the power tool 100. In addition to or in place of visual indicators, the indicators 245 may also include a speaker or a tactile feedback mechanism to convey information to a user through audible or tactile outputs. In some embodiments, the indicators 245 display information relating to a bind-up condition. For example, one or more LEDs are activated upon detection of a bind-up condition.

The battery pack interface 110 is connected to the controller 200 and is configured to couple with a battery pack 150. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 110 is coupled to the power input unit 260. The battery pack interface 110 transmits the power received from the battery pack 150 to the power input unit 260. The power input unit 260 includes active and/or passive components (e.g., voltage step-down controllers, voltage converters, rectifiers, filters, etc.) to regulate or control the power received through the battery pack interface 110 and to the controller 200. In some embodiments, the battery pack interface 110 is also coupled to the power switching network 255. The operation of the power switching network 255, as controlled by the controller 200, determines how power is supplied to the motor 280.

The motion sensor 250 senses motion of the power tool 100. In some embodiments, the motion sensor 250 is a gyroscope or an accelerometer. The motion sensor 250 may be situated in the handle 130 such that the motion sensor 250 senses motion of the handle 130 about the longitudinal axis 135. For example, the motor 280, upon actuation of the trigger 125, rotates a drill bit held by the driver 115. However, the drill bit may get stuck in a workpiece (e.g., a bind-up condition). As the motor 280 continues to drive the driver 115 (e.g., the trigger 125 continues to be actuated) when the drill bit is stuck, the housing 105 may begin to rotate about the longitudinal axis 135. Such an event may further result in a change in the voltage of the battery pack 150 or the current provided by the battery pack 150. These changes may be detected by secondary sensors 272. Additionally, an accelerometer included in the secondary sensors 272 may detect an orientation of the power tool 100 both prior to and during operation of the motor 280. In some embodiments, the current sensor 270 senses a current provided by the battery pack 150, a current associated with the motor 280, or a combination thereof.

Figure 3:
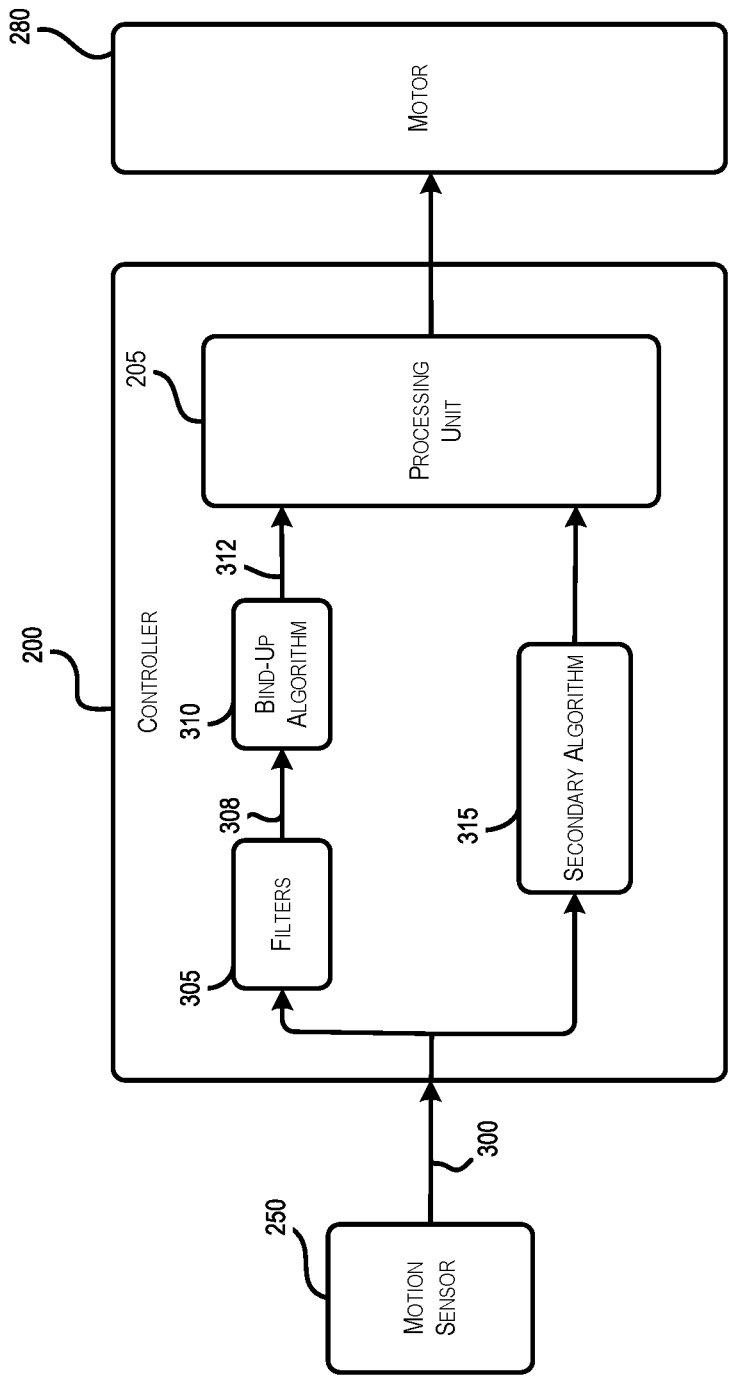
FIG. 3 illustrates a block diagram of signal processing performed by the controller of FIG. 2 in accordance with embodiments described herein.

FIG. 3 illustrates a block diagram for the processing of signals received by the motion sensor 250, according to some embodiments. As previously described, the motion sensor 250 senses motion of the power tool 100, such as motion of the housing 105 about a longitudinal axis 135. Sensed motion is converted into one or more motion signals 300. The one or more motion signals 300 are provided to memory 225 (e.g., for storage and retrieval by the processing unit 205). The memory 225 also includes one or more filters 305 and a bind-up algorithm 310. For example, the one or more filters 305 and the bind-up algorithm 310 may be stored in one of the program storage and the data storage. The processing unit 205 applies the one or more filters 305 to the motion signals 300, resulting in one or more filtered motion signals 308. The one or more filters 305 may contain, for example, a band-pass filter, a band-stop filter, a notch filter, a comb filter, an all-pass filter, a low-pass filter, a high-pass filter, a Chebyshev filter, a Butterworth filter, a Gaussian filter, a binary threshold, an offset, a scaling, an unfiltered direct pass-through, or the like.

The one or more filtered motion signals 308 are provided to a bind-up algorithm 310. The bind-up algorithm 310 is, for example, a linear combination of constant coefficients and the one or more filtered motion signals 308. In some embodiments, the bind-up algorithm 310 is a linear combination of constant coefficients and a plurality of monitored parameters of the power tool 100. The plurality of monitored parameters may include a current provided by the battery pack 150, a voltage provided by the battery pack 150, a temperature of the battery pack 150, a torque of the power tool 100, angular displacement of the power tool 100, angular velocity of the power tool 100, or angular acceleration of the power tool 100. In some embodiments, the bind-up algorithm 310 is obtained by multiplying together the filtered motion signals 308 from the one or more filters 305. Executing the bind-up algorithm 310 results in an output motion signal 312. The output motion signal 312 is provided to the processing unit 205. The processing unit 205 controls the motor 280 based on the output motion signal 312. For example, the processing unit 205 may determine a bind-up condition is occurring and initiate protective operations in response, as detailed further below.

In some embodiments, the output motion signal 312 is the output of a linear combination of the rotational speed of the housing 105 and the angle of the housing 105. The rotational speed of the housing 105 may be detected by the motion sensor 250 or calculated by the controller 200 based on signals received by the motion sensor 250. The angle of the housing 105 may be determined by the motion sensor 250 or an accelerometer included in the secondary sensors 272. For example, Equation 1 provides an output motion signal 312 according to one embodiment, where $\alpha$ is a first constant, $\beta$ is a second constant, rotSpeed is the rotational speed of the housing 105, and $angle_{totalRotation}$ is the total change in the angle of the housing 105.

$$Output_{Alg} = \alpha \cdot rotSpeed + \beta \cdot angle_{totalRotation} \quad \text{EQN. 1}$$

Equation 2 provides an output motion signal 312 according to another embodiment, where $\alpha$ is a first constant, $\beta$ is a second constant, rotSpeed is the rotational speed of the housing 105, and $angle_{totalRotation}$ is the total change in the angle of the housing 105 using a sliding window, or moving average, method.

$$Output_{Alg} = \alpha \cdot rotSpeed + \beta \cdot angle_{slidingWindow} \quad \text{EQN. 2}$$

In some embodiments, the output motion signal 312 is the output of the integral of the rotational speed of the housing 105. For example, Equation 3 provides an output motion signal 312 according to another embodiment, wherein rotSpeed is the rotational speed of the housing 105, t is the present time, and minSpeedParameter is a minimal acceptable speed of either the housing 105 or the driver 115.

$$\text{Output}_{Alg} = \int_{t-200\,ms}^{t} (\text{rotSpeed} > \text{minSpeedParameter}) dt \quad \text{EQN. 3}$$

The output motion signal 312 may also be based on a filtered rotational speed of the housing 105. For example, Equation 4 provides an output motion signal 312 according to another embodiment, wherein rotSpeed is the rotational speed of the housing 105, t is the present time, lpf is a lowpass filter with a time constant of T, and minSpeedParameter is a minimal acceptable speed of either the housing 105 or the driver 115.

$$\text{Output}_{Alg} = \int_{t-200\,ms}^{t} \text{lpf}(\text{rotSpeed}, T_{fast}) > \text{MinSpeedParameter}) dt \quad \text{EQN. 4}$$

Equation 5 provides an output motion signal 312 according to another embodiment, wherein rotSpeed is the rotational speed of the housing 105, lpf is a lowpass filter with a time constant of T, and RotationSpeed is the rotational speed of the driver 115, and $\text{Angle}_{totalRotation}$ is the total angular rotation of the housing 105.

$$\text{Output}_{Alg} = OR \begin{cases} lpf(\text{rotSpeed}, T_{fast}) - \\ lpf(\text{RotationSpeed}, T_{slow}) \\ \text{Angle}_{totalRotation} > 60\,deg \end{cases} \quad \text{EQN. 5}$$

In some embodiments, machine learning is used when calculating the output motion signal 312. For example, a convolutional neural network (CNN) is applied to the rotational speed of the housing 105. In some embodiments, the CNN is applied to the sliding window rotational speed of the housing 105. Other types of machine learning algorithms may be applied, such as a random forest, a support vector machine (SVM), a deep neural network (DNN), a decision tree, a recursive neural network (RNN), or the like.

In some embodiments, the one or more motion signals 300 are further provided to a secondary algorithm 315. For example, the one or more motion signals 300 may be provided to the one or more filters 305 and the bind-up algorithm 310, the secondary algorithm 315, or the combination of the one or more filters 305, the bind-up algorithm 310, and the secondary algorithm 315. The secondary algorithm 315 may be an additional method of processing the one or more motion signals 300. While stored in the memory 225, the secondary algorithm 315 may be executed by the processing unit 205. For example, the secondary algorithm 315 may include constantly comparing the one or more motion signals 300 to a rotational speed (e.g., angular velocity) threshold. Should the one or more motion signals 300 be greater than or equal to the rotational speed threshold, a counter is increased. Should the one or more motion signals 300 be less than the rotational speed threshold, the counter is decreased. If the counter exceeds a counter threshold, the processing unit 205 may determine a bind-up condition is occurring and initiate protective operations in response.

Figure 4:
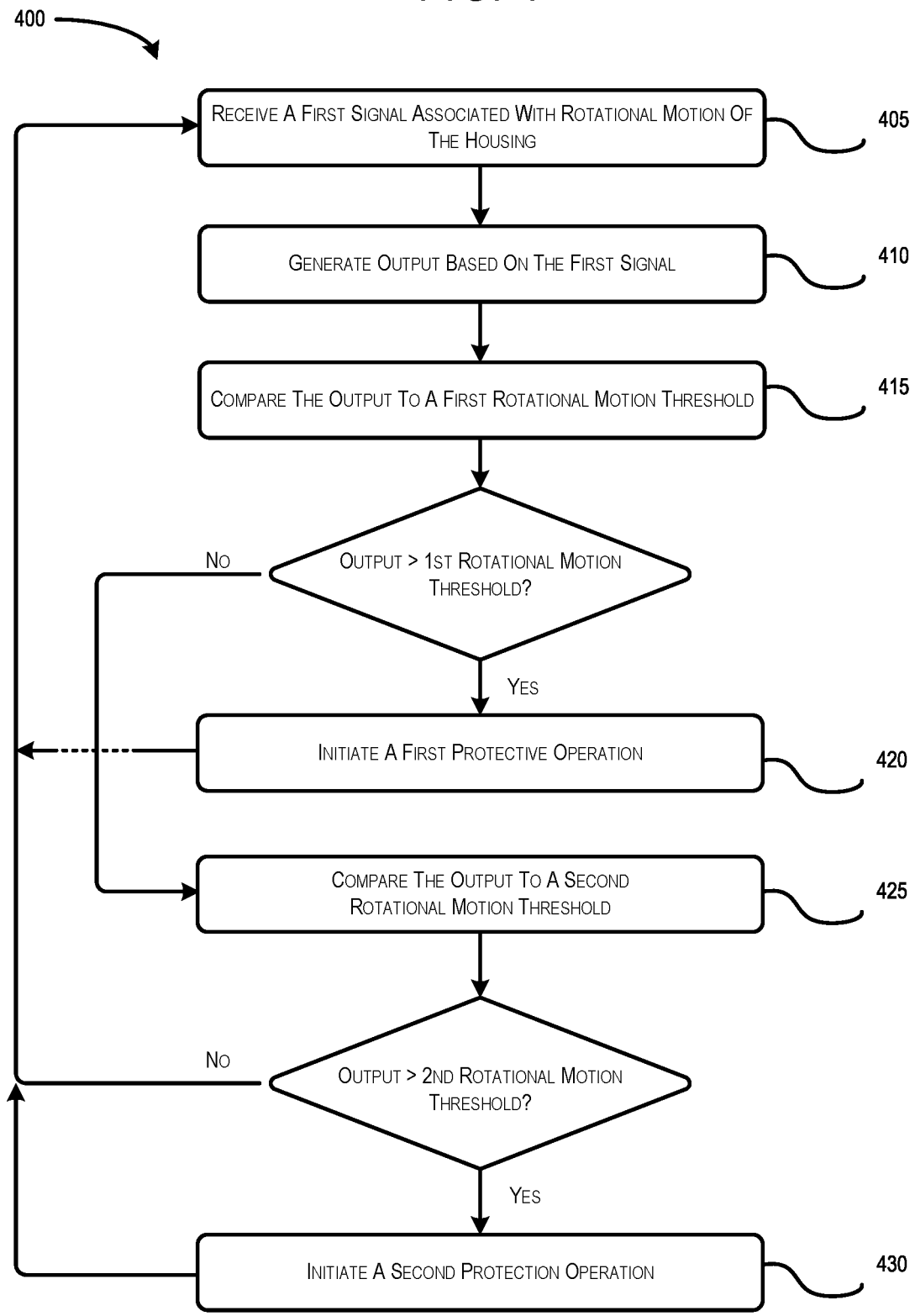
FIG. 4 illustrates a block diagram of a method of initiating protective operations performed by the controller of FIG. 2 in accordance with embodiments described herein.

To protect the power tool 100 and a user of the power tool 100 when a bind-up condition occurs, the controller 200 performs protective operations in response to the detected bind-up condition. For example, FIG. 4 is a flowchart of an example method 400 for detecting and acting upon bind-up conditions (e.g., an anti-bind-up condition algorithm). The method 400 may be performed by the controller 200. At block 405, the controller 200 receives a first signal associated with rotational motion of the housing 105. For example, a user of the power tool 100 actuates the trigger 125. Upon detecting actuation of the trigger 125, the controller 200 controls the switching network 255 to supply power to the motor 280. As the motor 280 rotates the driver 115, the controller 200 receives the one or more motion signals 300 from the motion sensor 250.

The controller 200 continuously receives the one or more motion signals 300 from the motion sensor 250. For example, the controller 200 may receive the one or more motion signals 300 prior to operation of the motor 280, during operation of the motor 280, and during a braking operation of the motor 280. At block 410, the controller 200 generates an output based on the first signal. As previously described, the one or more filters 305 and the bind-up algorithm 310 are implemented with respect to the one or more motion signals 300 to generate an output motion signal 312 (i.e., an output). The processing unit 205 receives the generated output motion signal 312. At block 415, the controller 200 compares the output to a first rotational motion threshold. If the output is not greater than or equal to the first rotational motion threshold, the controller 200 proceeds to block 425. If the polynomial output is greater than or equal to the first rotational motion threshold, the controller 200 continues to block 420.

At block 420, the controller 200 initiates a first protective operation. The first protection operation may be, for example, a braking of the motor 280 and a shutoff of the motor 280. For example, the controller 200 may control the power switching network 255 to brake the motor 280 to a lower speed or brake to a complete stop. In some embodiments, the controller 200 controls the switching network 255 to stop current from being provided to the motor 280. After initiating the first protective operation, the controller 200 returns to block 405 and continues to receive signals associated with rotational motion of the housing 105. In some embodiments, control of the motor during the first protective operation ranges from full motor power (e.g., no response), reduced motor power (e.g., throttling), coasting of the motor, a reduced braking force (using PWM braking, a discrete braking resistor, a mechanical brake, etc.), a regular braking force (e.g., a normal braking operation of the motor 280, a braking force greater than the reduced braking force), and a hard braking force (e.g., a greater braking force than the normal braking operation). In some embodiments, a secondary braking device (such as a solenoid clutch) may be implemented during the first protective operation. In some embodiments, the first protective operation is a combination any two of the previously-described braking operations. In some embodiments, the controller 200 is configured to dynamically choose the required braking force based on which sensors provide inputs to the controller 200.

Should the output be less than the first rotational motion threshold, the controller 200 proceeds to block 425 and compares the output to a second rotational motion threshold. For example, the generated output motion signal 312 is compared to a second rotational motion threshold stored in the memory 225. If the output is less than the second rotational motion threshold, the controller 200 returns to block 405. If the output is greater than or equal to the second rotational motion threshold, the controller 200 continues to block 430.

At block 430, the controller 200 initiates a second protective operation. In some embodiments, the second protective operation is throttling the motor 280 (e.g., a throttling operation) or pulsing the motor 280 (e.g., a pulsing operation). For example, upon the output motion signal 312 exceeding the first rotational motion threshold, the controller 200 detects a bind-up condition. The controller 200 reduces the amount of power (e.g., current) provided to the motor 280 using at least one of the power input unit 260 and the switching network 255. In some embodiments, the controller 200 controls the switching network 255 to pulse the amount of current provided to the motor 280. In some embodiments, the controller 200 returns to block 405 and continues to receive signals associated with rotational motion of the housing 105. In some embodiments, control of the motor during the second protective operation ranges from full motor power (e.g., no response), reduced motor power (e.g., throttling), coasting of the motor, a reduced braking force (using PWM braking, a discrete braking resistor, a mechanical brake, etc.), a regular braking force (e.g., a normal braking operation of the motor 280, a braking force greater than the reduced braking force), and a hard braking force (e.g., a greater braking force than the normal braking operation. In some embodiments, a secondary braking device (such as a solenoid clutch) may be implemented during the first protective operation. In some embodiments, the second protective operation is a combination any two of the previously-described braking operations. In some embodiments, the controller 200 is configured to dynamically choose the required braking force based on which sensors provide inputs to the controller 200.

In some embodiments, the first rotational motion threshold is an upper rotational motion threshold, and the second rotational motion threshold is a lower rotational motion threshold. The controller 200 may compare the output to the lower rotational motion threshold and the upper rotational motion threshold simultaneously. In some embodiments, the amount of throttling of the motor 280 for the first protective operation and/or the second protective operation are based on or dependent on the degree of rotational motion. For example, a greater amount of rotational motion will result in a greater throttling operation (e.g., 50% of normal operating power provided to the motor 280). For example, should the output be greater than the upper rotational motion threshold, the controller 200 skips the second protective operation (e.g., reducing current provided to the motor 280) and immediately performs the first protective operation (braking the motor 280 to a stop). In some embodiments, throttling is always being performed (e.g., 99% duty cycle is still throttling) and is not disabled.

Figure 5:
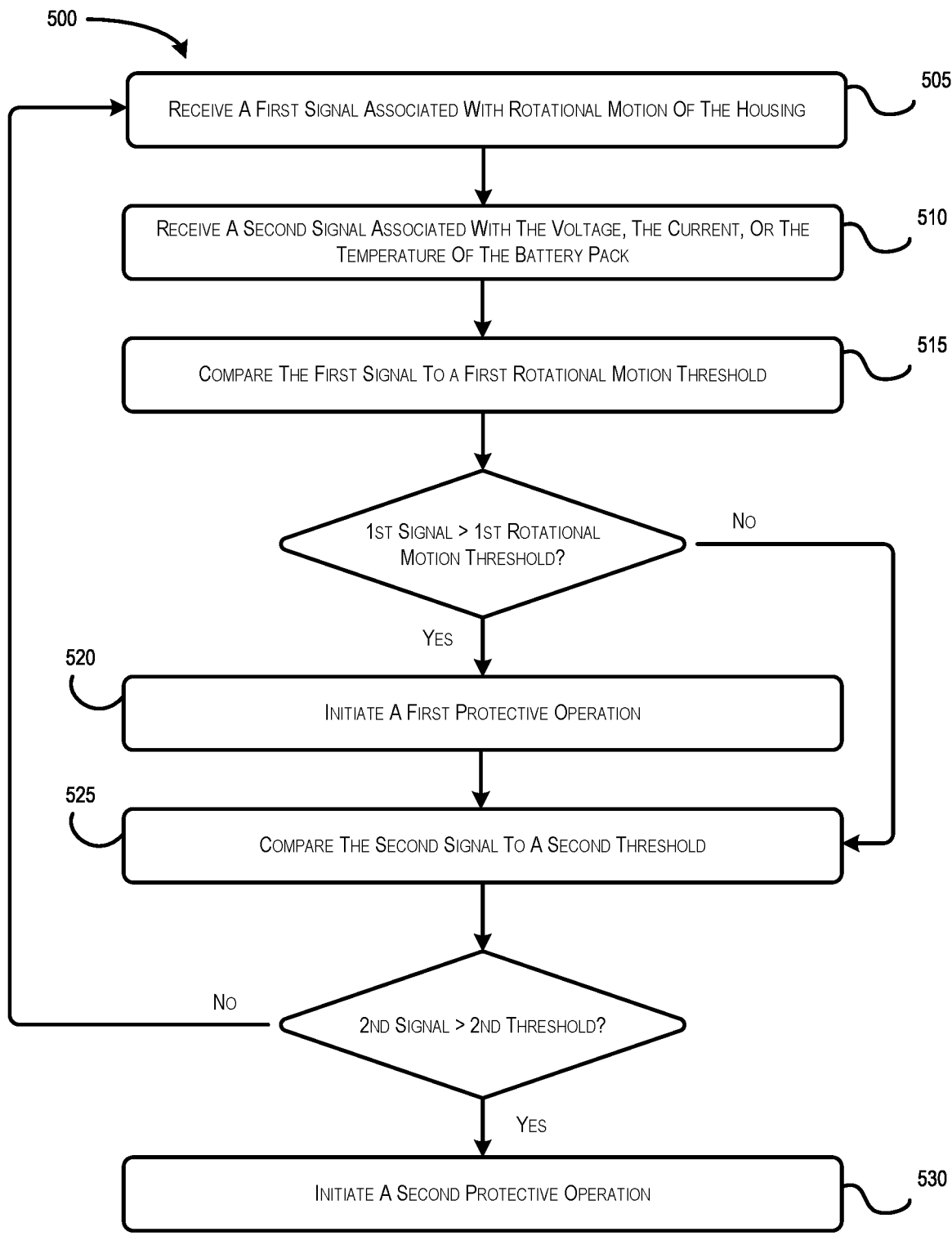
FIG. 5 illustrates a block diagram of an additional method of initiating protective operations performed by the controller of FIG. 2 in accordance with embodiments described herein.
Figure 6:
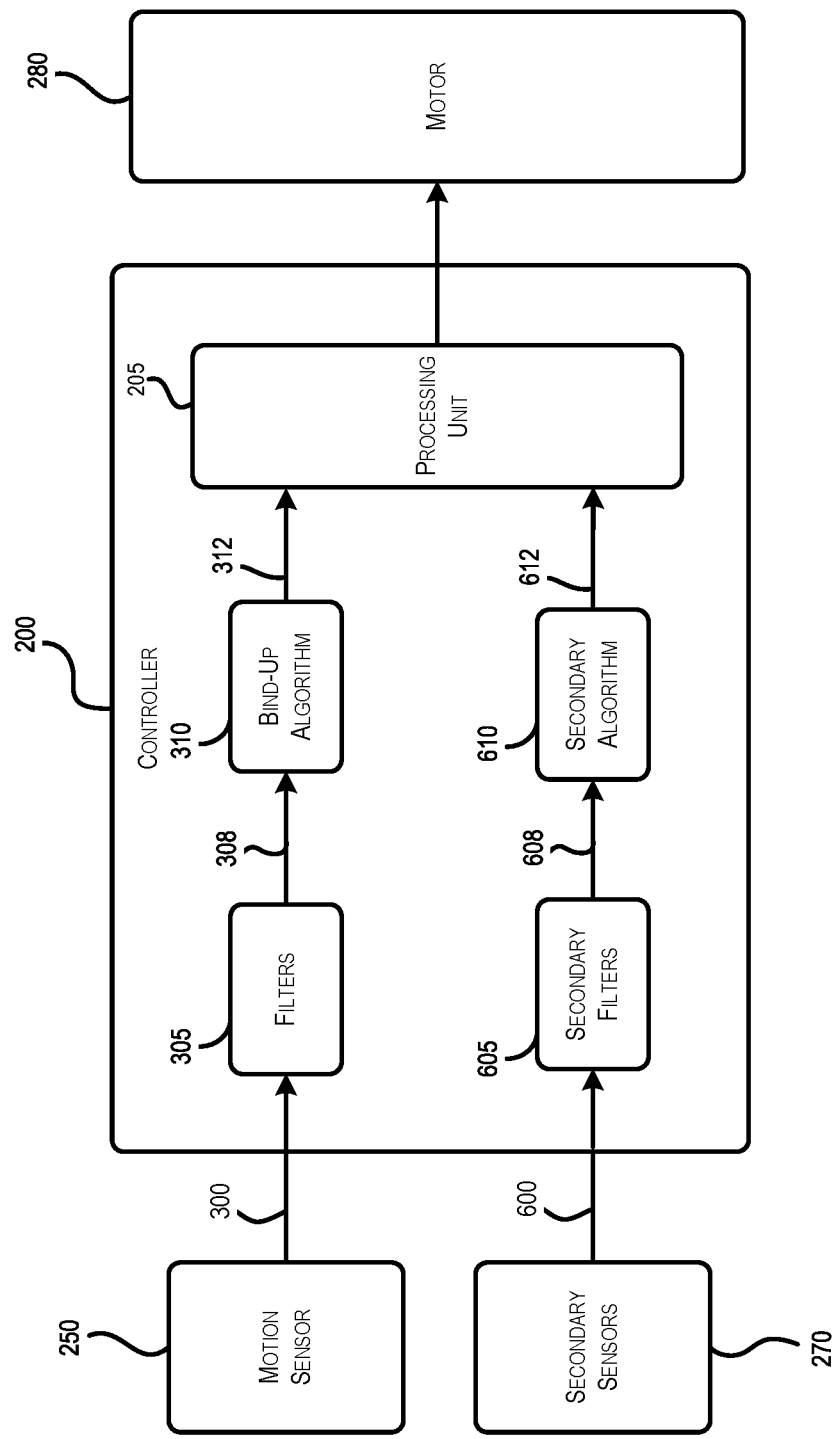
FIG. 6 illustrates a block diagram of signal processing performed by the controller of FIG. 2 in accordance with embodiments described herein.

When determining a bind-up condition is present, the controller 200 may further account for signals from the current sensor 270 and/or the secondary sensors 272. FIG. 5 is a flowchart of an example method 500 for accounting for additional conditions of the power tool 100 when determining and acting upon bind-up conditions. At block 505, the controller 200 receives a first signal associated with rotational motion of the housing 105. For example, the controller 200 receives one or more motion signals 300 from the motion sensor 250, as previously described. At block 510, the controller 200 receives a second signal associated with at least one selected from a group consisting of a voltage of the battery pack 150, a current of the battery pack 150, or a temperature of the battery pack 150. As illustrated by FIG. 6, the secondary sensors 272 generate one or more secondary signals 600 (e.g., the second signal). The one or more secondary signals 600 are provided to the memory 225 for storage or retrieval by the processing unit 205.

The first signal (e.g., the one or more motion signals 300) are further provided to the one or more filters 305 and the bind-up algorithm 310 to provide output motion signals 312 to the processing unit 205, as previously described. One or more secondary filters 605 are applied to the one or more secondary signals 600 in a similar manner as how the one or more filters 305 are applied to the one or more motion signals 300. Applying the one or more secondary filters 605 to the one or more secondary signals 600 generates one or more filtered secondary signals 608. The one or more filtered secondary signals 608 are provided to a secondary algorithm 610. Applying the secondary algorithm 610 to the one or more filtered secondary signals 608 generates an output secondary signal 612. The output secondary signal 612 is provided to the processing unit 205.

Equation 6 provides an output secondary signal 612 according to one embodiment, where $\alpha$, $\beta$ and $\gamma$ are constants, rotSpeed is the rotational speed of the housing 105, $angle_{slidingWindow}$ is the rotational angle of the housing 105 as determined using a sliding window, or moving average, method, current is the current provided by the battery pack 150 (e.g., the current provided to the motor 280), and lpf is a low pass filter having a time constant of T.

$$Output_{Alg} = \alpha \cdot rotSpeed + \beta \cdot angle_{slidingWindow} + \gamma \cdot lpf(current, T_{fast}) \quad \text{EQN. 6}$$

Equation 7 provides an output secondary signal 612 according to another embodiment, where $\alpha$, $\beta$ and $\gamma$ are constants, rotSpeed is the rotational speed of the housing 105, $angle_{slidingwindow}$ is the rotational angle of the housing 105 as determined using a sliding window, or moving average, method, and current is the current provided by the battery pack 150 (e.g., the current provided to the motor 280).

$$Output_{Alg} = \alpha \cdot rotSpeed + \beta \cdot angle_{slidingWindow} + \gamma \cdot current \quad \text{EQN. 7}$$

Equation 8 provides an output secondary signal 612 according to another embodiment, where $\alpha$, $\beta$ and $\gamma$ are constants, lpf is a low pass filter having a time constant of T, current is the current provided by the battery pack 150, and SpeedRPM is the speed of the driver 115 (e.g., the motor 280).

$$Output_{Alg} = \alpha \frac{[lpf(current, T_{fast}) - lpf(current, T_{slow})]^2}{1 + \beta \cdot lpf(SpeedRPM, T_{slow}) - \gamma \cdot lpf(SpeedRPM, T_{fast})} \quad \text{EQN. 8}$$

Equation 9 provides an output secondary signal 612 according to another embodiment, where $\alpha$ and $\beta$ are constants, torque is the torque of the driver 115, param is a torque threshold, and t is the present time.

$$Output_{Alg} = \int_{t-200\,ms}^{t} \alpha \cdot (torque > param_1) + \beta (torque > param_2) + \ldots dt \quad \text{EQN. 9}$$

In some embodiments, machine learning is used to analyze the signals provided by the current sensor 270 and/or the secondary sensors 272. For example, a random forest may be applied to a current measurement, a speed measurement, a voltage measurement, a torque measurement, or the like. Additionally, although illustrated in FIG. 6 as the one or more motion signals 300 being fed into the bind-up algorithm 310 and the secondary signals 600 being fed into the secondary algorithm 610, both the signals from the motion sensor 250 and the signals from the secondary sensor(s) 272 may be fed into the same algorithm.

Returning to FIG. 5, at block 515, the controller 200 compares a value for the first signal (e.g., the output motion signals 312) to a first rotational motion threshold (e.g., a first threshold). If the first signal is equal to or greater than the first rotational motion threshold, the controller 200 continues to block 520. Regardless of if the first signal is less than, greater than, or equal to the first rotational motion threshold, the controller 200 also continues to block 525. At block 520, the controller 200 initiates a first protective operation, as described above.

At block 525, the controller 200 compares the second signal (e.g., the output secondary signal 612) to a second threshold (for example, a voltage threshold, a current threshold, a temperature threshold, etc.). If the second signal is less than the second threshold, the controller 200 returns to block 505 and continues to receive first signals from the motion sensor 250 and second signals from the secondary sensors 272. If the second signal is equal to or greater than the second threshold, the controller 200 proceeds to block 530. At block 530, the controller 200 initiates a second protective operation. For example, in FIG. 6, the processing unit 205 controls the motor 280 according to a second protective operation, as described above.

While embodiments primarily refer to detection of rotational motion to detect bind-up conditions, some power tools may refer solely on detected output conditions of the motor 280 to detect bind-up. For example, the controller 200 may monitor the output current of the motor 280, the output torque of the motor 280, a rotational rate of the motor 280, or a combination thereof to determine the occurrence of a bind-up condition without monitoring rotational motion of the housing 105.

The controller 200 may adjust aspects of the bind-up condition detection based on additional detected conditions of the power tool 100. For example, FIG. 7 is a flowchart of an example method 700 for adjusting the bind-up detection algorithm based on a detected potential contact of the power tool 100. The method 700 may be performed by the controller 200. At block 705, the controller 200 receives a first signal associated with rotational motion of the housing 105, as described previously. At block 710, the controller 200 receives an input associated with a distance between the power tool 100 and an object. The object may be, for example, a wall stud or other object that the power tool 100 may come into contact with should a bind-up event occur. The object may be detected by the proximity sensor 140.

In some embodiments, the controller 200 detects the object upon beginning to drive the motor 280. For example, when the trigger 125 is actuated, the controller 200 receives a signal from the proximity sensor 140 indicative of a distance between the power tool 100 and an object next to the power tool 100. Should the driver 115 (e.g., the motor 280) be driven in a forward, or clockwise, direction, the proximity sensor 140 detects an object to the right of the power tool 100. Alternatively, should the driver 115 be driven in a reverse, or counter-clockwise direction, the proximity sensor 140 detect an object to the left of the power tool 100. In some embodiments, a user of the power tool 100 may tap the power tool 100 against the object prior to actuation of the trigger 125. The power tool 100 may be tapped on the object a predetermined plurality of times, with a predetermined magnitude of strength, or with sufficient quality in order to detect the object. The controller 200 may detect the contact with the object based on a signal received by the motion sensor 250 or one of the secondary sensor(s) 272, such as an accelerometer. Upon detecting the object, the controller 200 may control one of the indicator(s) 245 to turn on, notifying the user of the object. Furthermore, a motion sensor, such as motion sensor 250, may be used by the controller 200 to integrate the tool motion after contact and determine the distance between the power tool and the object. In some embodiments, the motion sensor 250 may detect the direction of gravity and provide an angle with respect to the ground that estimates the angular distance to the object, such as if the power tool 100 is operated substantially horizontally. In some embodiments, a magnetometer may determine rotation of the power tool 100 (e.g., driver 115) with respect to the earth's magnetic fields.

At block 715, the controller 200 adjusts the bind-up detection algorithm based on the distance. For example, the controller 200 may select predetermined filters 305 or secondary filters 605 based on the contact with the object. The controller 200 may alter the bind-up algorithm 310, the secondary algorithm 610 or the secondary algorithm 315 based on the contact with the object. In some embodiments, the first rotational motion threshold, the second rotational motion threshold, or the second threshold are modified (e.g., reduced) based on the contact with or proximity of the object. In some embodiments, the controller 200 constantly monitors the distance between the power tool 100 and the object. Accordingly, the controller 200 may adjust the bind-up detection algorithm once the distance passes a distance threshold (e.g., the power tool 100 approaches the object). In some embodiments, the controller 200 adjusts the bind-up detection algorithm based on a predicted future distance.

While described as adjusting the bind-up detection algorithm based on potential contact of the power tool 100, method 700 may also be used in situations of operating the power tool 100 at elevated heights. For example, should a user of the power tool 100 be on an object such as a ladder, the power tool 100 may be tapped on the ladder. The controller 200 adjusts the bind-up detection algorithm based on the tapping, such as making the bind-up control more sensitive to movement.

Figure 8A:
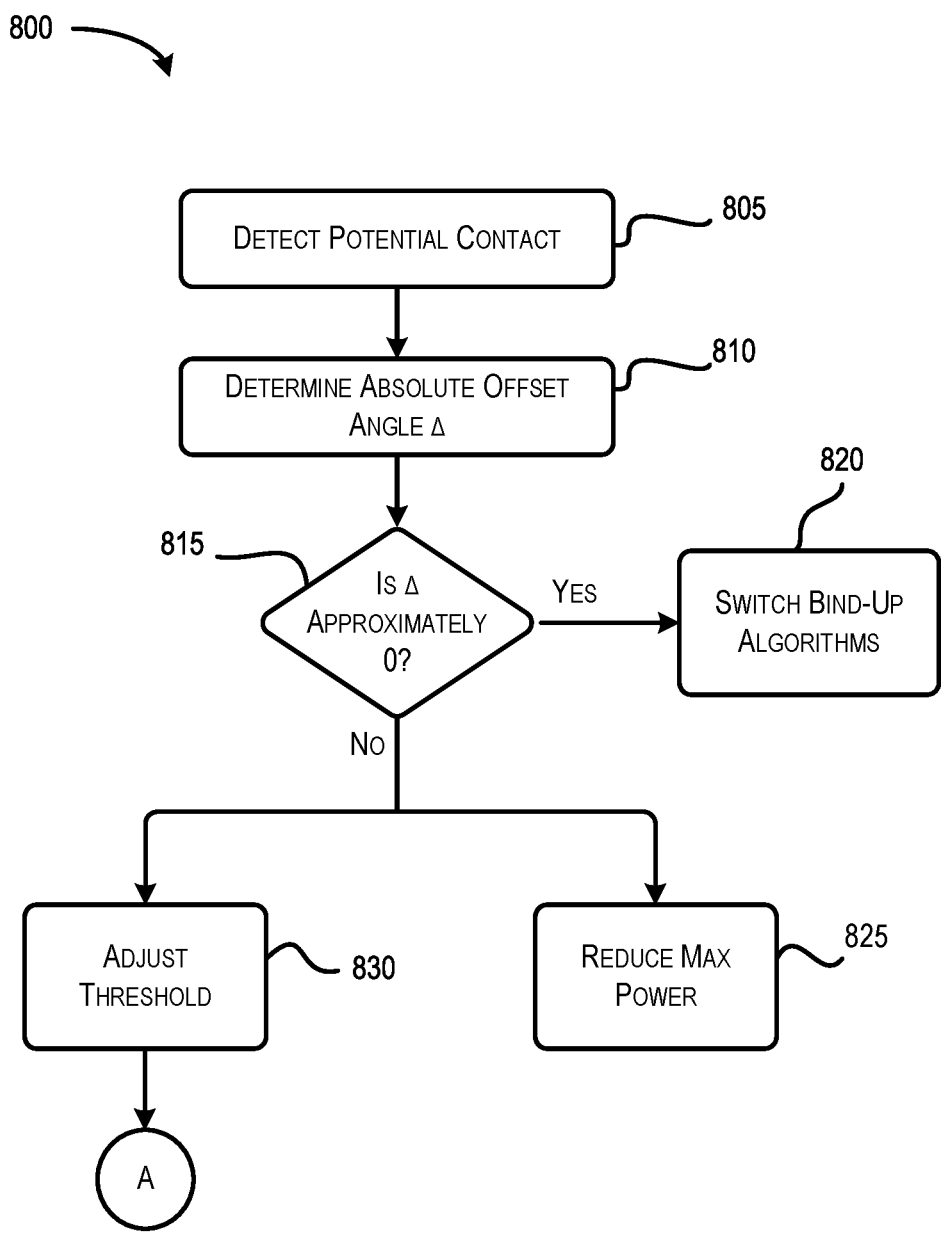
FIGS. 8A-8B illustrate a block diagram of a method of adjusting a bind-up detection algorithm performed by the controller of FIG. 2 in accordance with embodiments described herein.
Figure 8B:
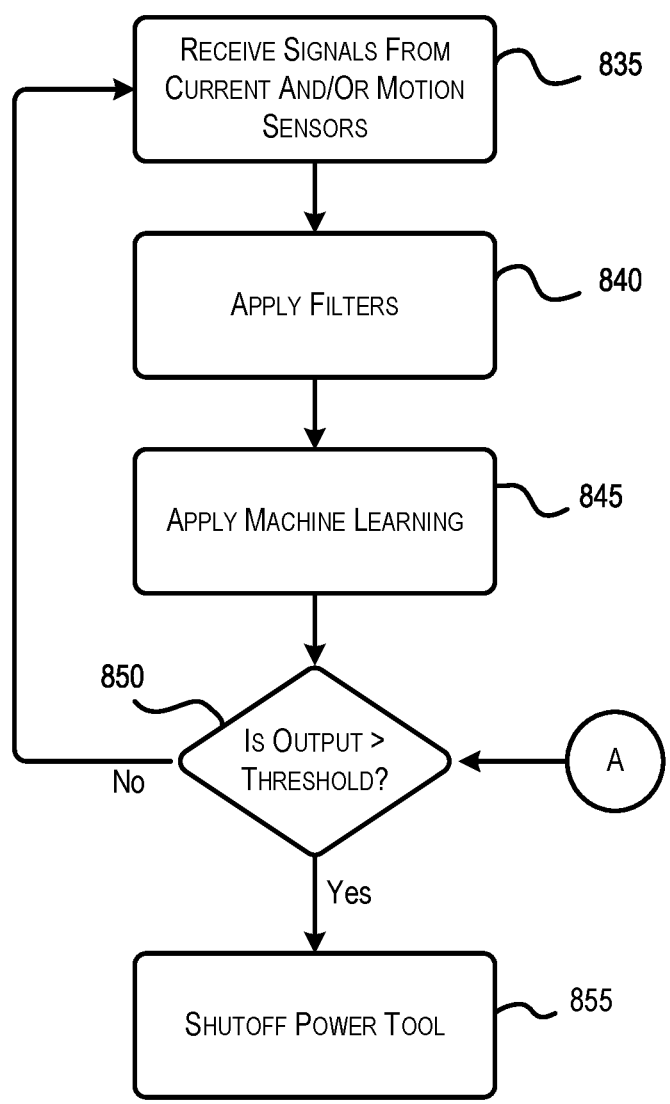

FIGS. 8A-8B provide a method 800 of adjusting the bind-up detection algorithm based on a detected potential contact of the power tool 100 with an object according to another embodiment. The method 800 may be performed by the controller 200. At block 805, the controller 200 detects potential contact of the power tool 100 with an object, as previously described. At block 810, the controller 200 determines the absolute offset angle Δ, or the angle between the power tool 100 and the object, measured from the proximity sensor 140. At block 815, the controller 200 determines whether the absolute offset angle Δ is approximately 0. If the absolute offset angle Δ is approximately 0, the power tool 100 is very close to the object and proceeds to block 820. In some embodiments, the controller 200 determines whether the absolute offset angle Δ is approaching 0. If the anticipated offset angle Δ trajectory is predicted to reach 0, the controller 200 proceeds to block 820. At block 820, the controller 200 switches bind-up algorithms. In some embodiments, at block 820, the controller 200 disables the power tool 100. For example, if the motor 280 is rotating and the power tool 100 and/or the battery pack 150 is about to contact the object, rather than reducing power provided to the motor 280, the controller 200 may shut-off the power tool to avoid contact with the object. In some embodiments, the controller 200 powers the motor 280 such that it more quickly brakes or rotates in the other direction, such that a user of the power tool 100 is not injured by the contact. Braking of the motor 280 may be controlled as previously described with respect to block 402 and block 430. In some embodiments, the controller 200 disables the bind-up control or increases the bind-up threshold in response to the power tool 100 being braced.

If the absolute offset angle Δ is not approximately 0, the controller 200 proceeds to block 825 and block 830. Block 825 and block 830 may be performed by the controller 200 simultaneously. At block 825, the controller 200 reduces the maximum power provided to the motor 280. The amount the maximum power is reduced may be dependent upon the value of the absolute offset angle Δ or a derivative of the absolute offset angle Δ (the speed at which the power tool 100 approaches the object). In some embodiments, at block 825 the controller 200 performs a protective operation, such as scaling power output by a fraction of trigger output or pulsing the motor 280. At block 830, the controller 200 adjusts a rotational motion threshold. For example, should the absolute offset angle Δ be small (for example, less than 20°), the rotational motion threshold may be reduced such that the controller 200 is more sensitive to a bind-up condition.

In some embodiments, translation distance may be estimated (e.g., via dead reckoning) to estimate the distance to a foreign object. For example, a user may not "tap" a foreign object with the power tool 100 purely via rotation about the longitudinal axis 135. Accordingly, the controller 200 may account for translation of the power tool 100 to determine the distance from the foreign object. In some embodiments, the magnitude or other characteristic of the "tap" (such as a hardness or strength of the tap) is used by the controller 200 in determining an appropriate bind-up adjustment (e.g., selection of an algorithm, a threshold, or a braking operation described above). In some embodiments, the sensitivity or characteristic of the bind-up algorithm is modified based on detection of a "tap" of a foreign object with the power tool 100.

Continuing to FIG. 8B, at block 835, the controller 200 receives one or more current signals from the current sensor 270 and/or one or more motion signals from the motion sensor 250. At block 840, the controller 200 applies one or more filters, such as the one or more filters 305, to the received one or more current signals and the one or more motion signals. At block 845, a machine learning algorithm is applied to the filtered one or more current signals and the filtered one or more motion signals, as described with respect to the bind-up algorithm 310. At block 850, the output of the machine learning algorithm is compared to the adjusted rotational motion threshold. If the output is not greater than the adjusted rotational motion threshold, the controller 200 returns to block 835. If the output is greater than the adjusted rotational motion threshold, the controller 200 shuts off the power tool 100. For example, the controller 200 stops providing current to the motor 280, or brakes the motor 280 to a stop. In some embodiments, rather than shutting off the power tool 100, the controller 200 may perform some other protective operation, such as further reducing the power provided to the motor 280.

The controller 200 may further adjust the bind-up detection algorithm based on an initial orientation of the power tool 100. For example, FIG. 9 provides a method 900 for adjusting the bind-up detection algorithm based on an initial orientation of the power tool 100. At block 905, upon driving the motor 280, the controller 200 determines an initial orientation of the power tool 100. The initial orientation of the power tool 100 may be determined based on a signal provided by an accelerometer of the secondary sensors 272. In some embodiments, the orientation of the power tool 100 is determined based on a detected direction of gravity. The initial orientation of the power tool 100 may be determined in response to an actuation of the trigger 125. The controller 200 may also determine the orientation of the power tool 100 prior to actuation of the trigger 125. At block 910, the controller 200 adjusts the bind-up detection algorithm in a manner similar to that of block 715 in method 700.

The controller 200 may also be capable of performing other protective features designed to prevent overheating of the battery pack 150, the motor 280, motor electronics (such as the switching network 255), or other components of the power tool 100. While some protective features are implemented as mechanical features, such as a fuse, breaker, etc., many are performed by the controller 200 (e.g., hardware overcurrent, overheating protection of a MOSFET, motor winding, or other component, gate drive refresh, etc.). For example, should overheating of the battery pack 150 begin to occur, the controller 200 may briefly reduce power while avoiding a full shutoff, as illustrated in FIG. 10. Power may be reduced using a pulsing, pulse width modulation (PWM) technique, or brief relief periods, as shown between times 29.83 seconds and 29.98 seconds in FIG. 10. The controller 200 reducing the power provided to the motor 280 in response to measured overheating, overcurrent, or voltage drop events (e.g., as determined by the battery pack 150) is referred to as a "battery fetting" event. The need to have such protective feature may be determined by the battery pack 150 providing to the power tool 100 a signal (such as a thermocouple) indicative of a need for the protective feature, and/or purely by the power tool 100. Battery fetting may impact movement of the power tool 100 during a bind up condition, as the measured rotational degrees of the power tool 100 decrease from times 29.80 seconds to 29.95 seconds in FIG. 10 following the pulse width modulation control. Accordingly, the controller 200 may further adjust the bind-up detection algorithm (e.g., lower threshold value) based on the other protective features that decrease output torque, output speed, or power of the power tool 100.

Figure 11:
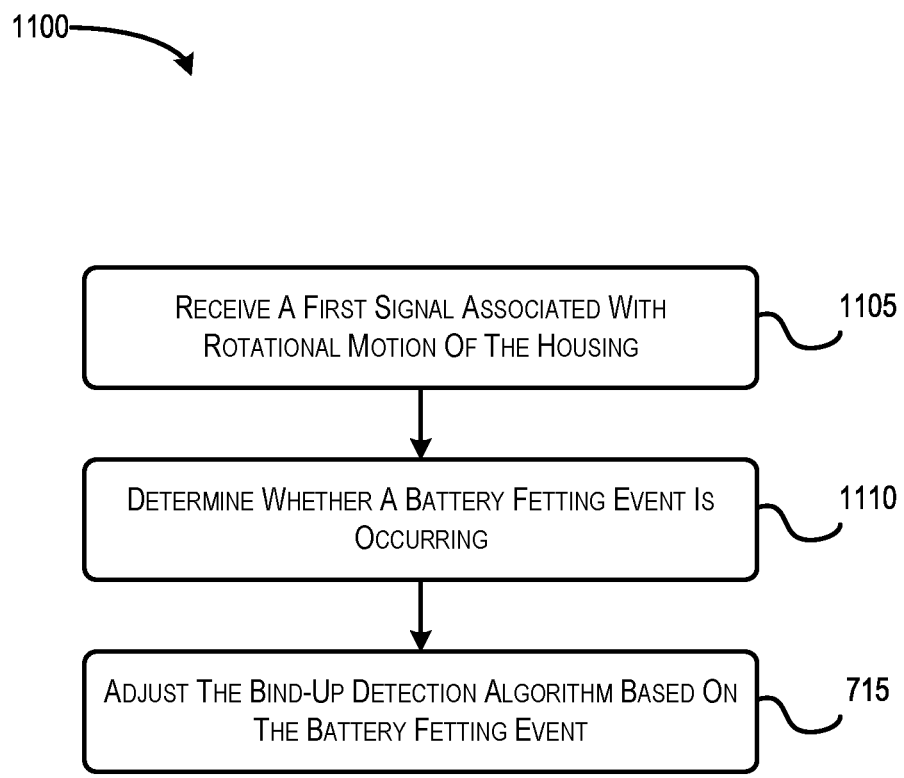
FIG. 11 illustrates a block diagram of a method of adjusting a bind-up detection algorithm performed by the controller of FIG. 2 in accordance with embodiments described herein.

FIG. 11, for example, provides a method 1100 for adjusting the bind-up algorithm based on a battery fetting event. The method 1100 may be performed by the controller 200. At block 1105, the controller 200 receives a first signal associated with rotational motion of the housing 105, as previously described. At block 1110, the controller 200 determines whether a battery fetting event is occurring, such as by detecting the decrease in output torque, the decrease in output speed, a temperature of the battery pack 150, a decrease in current provided to the motor 280, or a decrease in voltage provided by the battery pack 150. In some embodiments, the battery pack 150 transmits a request to the controller 200 to decrease power provided to the motor 280. At block 1115, the controller 200 adjusts the bind-up detection algorithm based on the battery fetting event. For example, a rotational motion threshold may be decreased. In some embodiments, determination of the battery fetting event is non-binary. For example, the battery fetting event may be a multi-step event or a continuous fetting event. Accordingly, the bind-up detection algorithm may be adjusted based on the multi-step or continuous event. In other embodiments, the battery fetting event may be anticipated by the controller 200. For example, the controller 200 may adjust the bind-up detection algorithm based on a prediction that a battery fetting event is likely to happen. The prediction is based on, for example, a falling voltage of the battery pack 150, a low voltage of the battery pack 150, an impedance of the battery pack 150, or a combination thereof.

Figure 12:
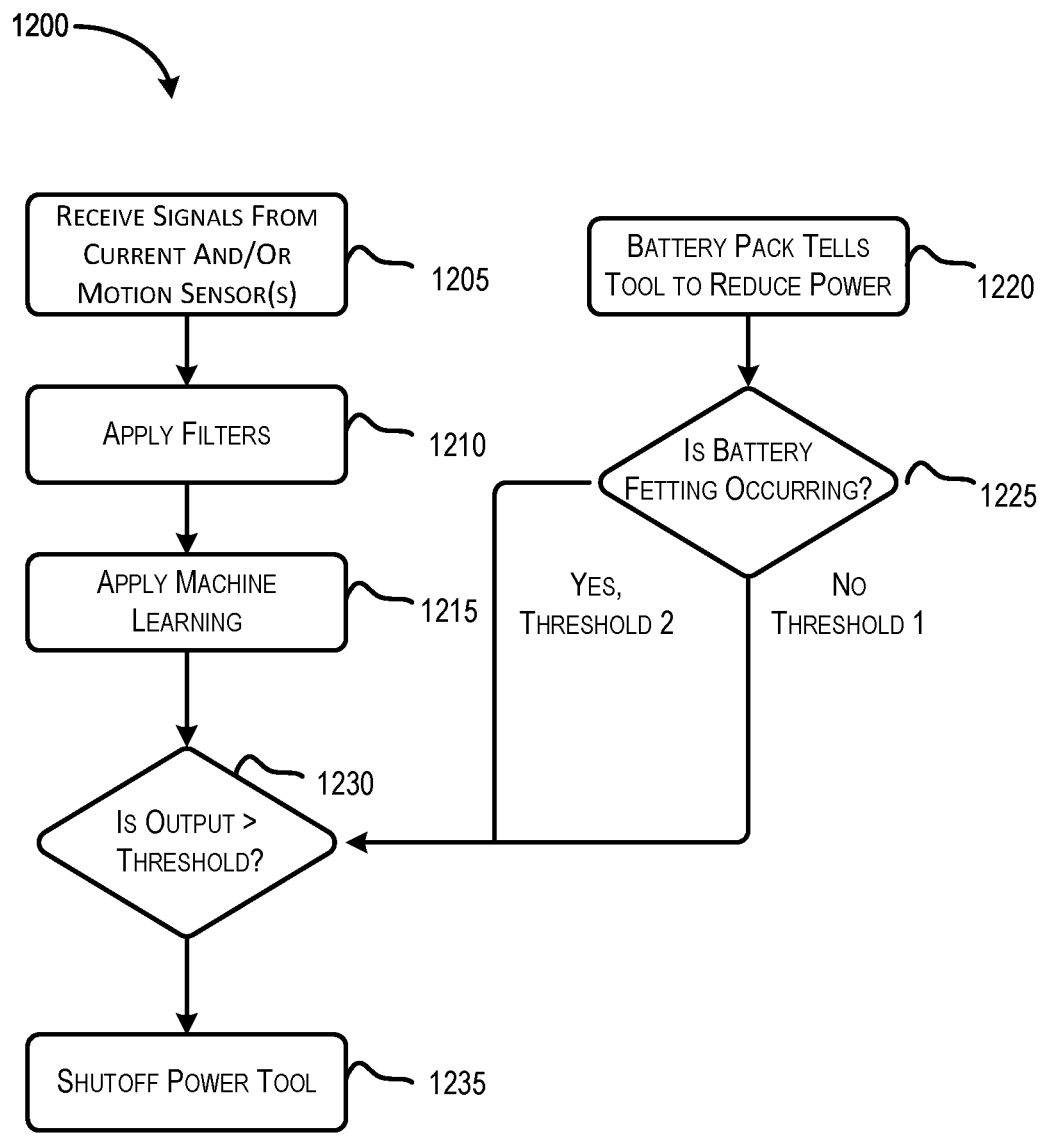
FIG. 12 illustrates a block diagram of a method of adjusting a bind-up detection algorithm performed by the controller of FIG. 2 in accordance with embodiments described herein.

FIG. 12 provides a method 1200 of adjusting the bind-up detection algorithm based on a battery fetting event. The method 1200 may be performed by the controller 200. At block 1205, the controller 200 receives one or more current signals from the current sensor 270 and/or one or more motion signals from the motion sensor 250. At block 1210, the controller 200 applies one or more filters, such as the one or more filters 305, to the received one or more current signals and the one or more motion signals. At block 1215, a machine learning algorithm is applied to the filtered one or more current signals and the filtered one or more motion signals, as described with respect to the bind-up algorithm 310, and the controller 200 proceeds to block 1230.

Additionally and/or simultaneously to blocks 1205-1215, at block 1220, the controller 200 of the power tool 100 may receive a signal from the battery pack 150 to reduce power provided to the motor 280. In some embodiments, the battery pack 150 reduces the power the battery pack 150 provides to the power tool 100, and therefore the motor 280. At block 1225, the controller 200 determines whether a battery fetting event is occurring, as previously described. If a battery fetting event is not occurring, at block 1230, the output of the machine learning algorithm is compared to a first threshold. In some embodiments, the first threshold is determined by a hysteresis and/or filtering event between block 1225 and block 1230. If a battery fetting event is occurring, at block 1230, the output of the machine learning algorithm is compared to a second threshold. If the output of the machine learning algorithm is greater than the selected threshold, at block 1235 the controller 200 shuts off the power tool 100.

Furthermore, the detecting of a battery fetting event or another limiting event of the power tool 100 may result in the adjustment of a protective action by the controller 200, such as modifying a braking response of the power tool 100. Accordingly, in addition to providing a safeguard to the power tool 100 and/or the battery pack 150, detection of a battery fetting event may be used to adjust a protective response for a user.

Figure 13:
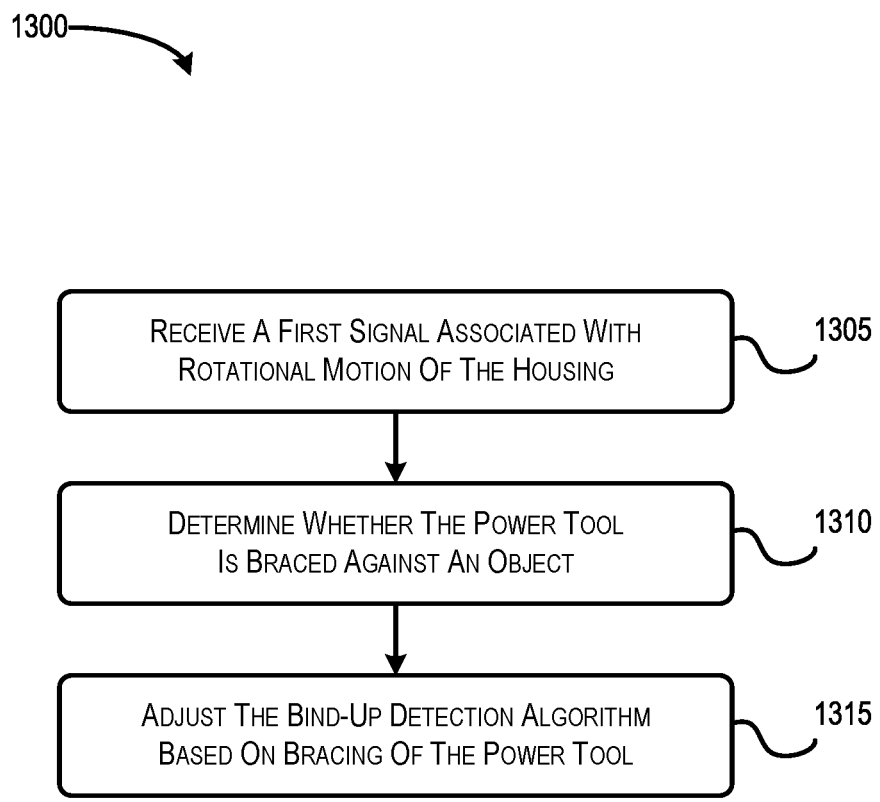
FIG. 13 illustrates a block diagram of a method of adjusting a bind-up detection algorithm performed by the controller of FIG. 2 in accordance with embodiments described herein.

In some embodiments, the handle 130, the housing 105, or the battery pack 150 of the power tool 100 may be braced against an object while the motor 280 is being driven, like a leg of the user, an arm of a user, or a wall stud. In some embodiments, the power tool 100 is linked to a power tool accessory to brace the housing 105, such as a clamp. While being braced, the power tool 100 may experience significantly less rotational motion. Accordingly, the controller 200 may adjust the bind-up algorithm when bracing is occurring. For example, FIG. 13 provides a method 1300 for adjusting the bind-up detection algorithm based on a bracing of the power tool 100. The method 1300 may be performed by the controller 200. At block 1305, the controller 200 receives a first signal associated with rotational motion of the housing 105, as previously described. At block 1310, the controller 200 determines whether the power tool is braced against an object. For example, the controller 200 may receive one or more current signals from the current sensor 270 and one or more motion signals from the motion sensor 250. Should the current signals indicate a high current value, while the motion signals indicate little motion of the housing 105, at block 1310 the controller 200 may determine the power tool 100 is braced against an object. In some embodiments, bracing of the power tool 100 is determined based on the speed of the motor 280 (e.g., a rotational rate of the motor 280) and rotation of the housing 105. In other embodiments, bracing of the power tool 100 is determined based on the current of the motor 280 and the speed of the motor 280. At block 1315, the controller 200 adjusts the bind-up detection algorithm based on the bracing event, as previously described.

In some embodiments, the controller 200 detects a characteristic indicative of a quality of the bracing. For example, a leg may be a "softer" bracing than a "harder" wall stud bracing. The controller 200 may use motion signals and other sensor inputs (such as a camera, pressure sensors, force sensors, and the like) to determine the quality of the bracing. In some embodiments, the controller 200 adjusts a motor driving characteristic based on the detected characteristic indicative of the bracing of the power tool 100. For example, if the power tool 100 is braced, the controller 200 may adjust a soft-start characteristic of the motor 280. As the power tool 100 is braced, the controller 200 allows the motor 280 to drive at a higher load. Additionally or alternatively, the controller 200 may increase a target torque output of the motor 280.

Figure 14:
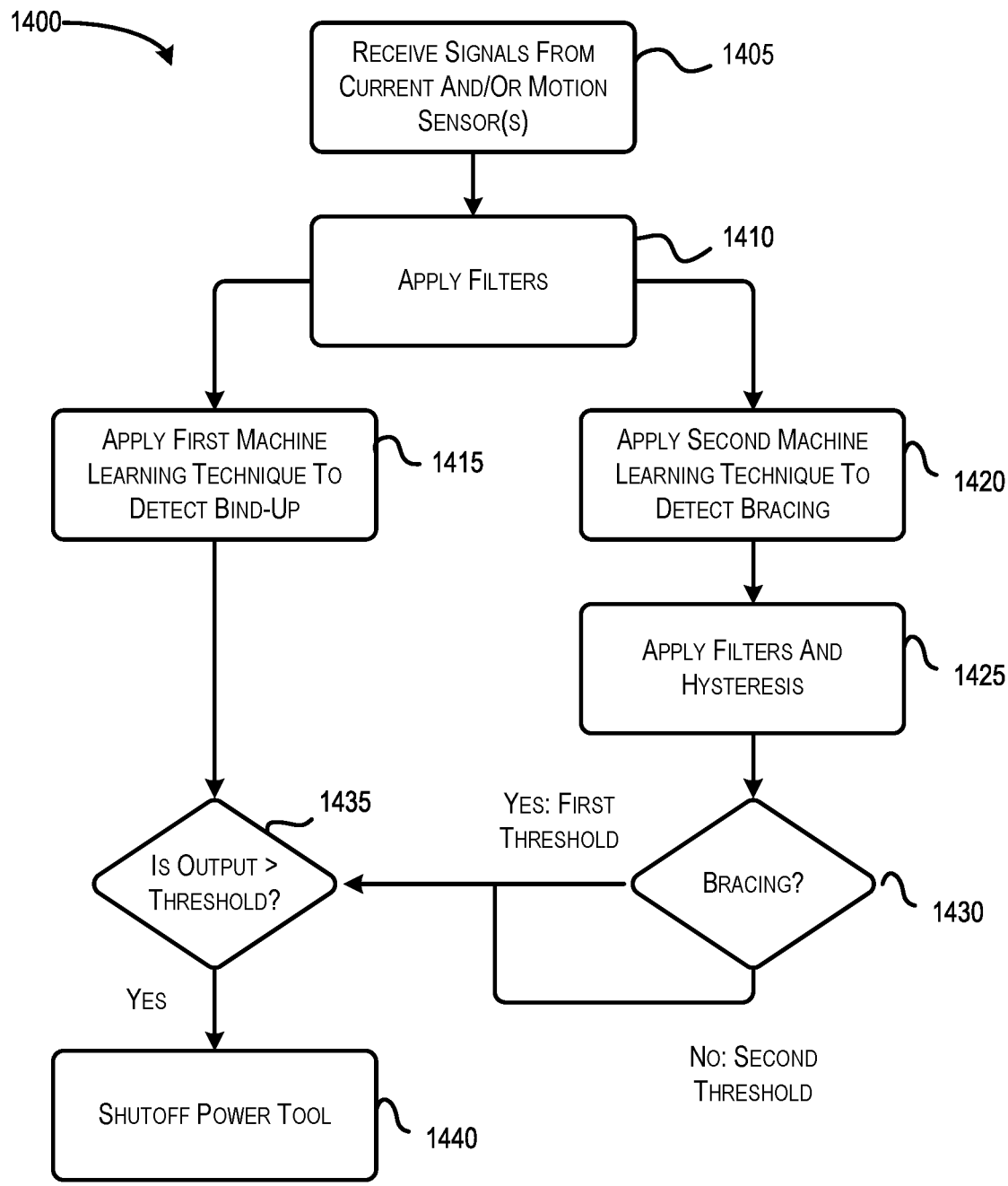
FIG. 14 illustrates a block diagram of a method of adjusting a bind-up detection algorithm performed by the controller of FIG. 2 in accordance with embodiments described herein.

FIG. 14 provides a method 1400 of adjusting the bind-up detection algorithm based on a bracing of the power tool 100 according to another embodiment. The method 1400 may be performed by the controller 200. At block 1405, the controller 200 receives one or more current signals from the current sensor 270 and/or one or more motion signals from the motion sensor 250. In some embodiments, in addition to or alternatively from the current signals and the motion signals, signals from a force sensor, a pressure sensor, or a capacitive sensor are received by the controller 200. At block 1410, the controller 200 applies one or more filters, such as the one or more filters 305, to the received one or more current signals and the one or more motion signals. At block 1415, the controller 200 applies a first machine learning technique to detect the bind-up event, as previously described. At block 1420, the controller 200 applies a second machine learning technique to detect bracing of the motor 280. For example, the one or more current signals and the one or more motion signals are analyzed to determine bracing, as previously described. Although illustrated as being performed simultaneously, in some embodiments, block 1420 may be performed before or after block 1415. At block 1425, the controller 200 applies one or more filters and/or hysteresis, such as the one or more filters 305, to the output of the second machine learning technique. In some embodiments, hysteresis may be applied to further filter the output of the second machine learning technique. While illustrated as before block 1430, the filters and/or hysteresis of block 1425 may instead be after block 1430 (such as to accept the output of block 1430).

At block 1430, the controller 200 determines whether bracing is occurring based on the filtered output of the second machine learning technique. If bracing is occurring, a first threshold is selected by the controller 200. If bracing is not occurring, a second threshold is selected by the controller 200. In some embodiments, the first threshold is larger than the second threshold such that the bind-up detection algorithm is less sensitive when the power tool 100 is being braced. At block 1435, the controller 200 compares the output of the first machine learning technique to the selected threshold. In some embodiments, the selected threshold of block 1435 is a continuous function (e.g., more than a binary function) of the detected bracing. If the output is greater than the selected threshold, at block 1440 the power tool 100 is shut off.

In some embodiments, the power tool 100 may be braced by a mechanical attachment (such as a mechanical arm) used to reduce a load on an operator of the power tool 100. Mechanical or electrical contact sensors of the power tool 100 may identify that the power tool 100 is coupled to the mechanical attachment. The controller 200 may then modify bind-up control based on the detection of the mechanical attachment. In some embodiments, bind-up control is disabled when the power tool 100 is coupled to the mechanical attachment.

When implementing the first protection operation or the second protective operation, the controller 200 may need to account for other aspects of the power tool 100. For example, some drills include a spindlelock to stop the driver 115 from rotating when the trigger 125 is released. In some embodiments, the spindlelock has a predetermined amount of slop, such as 10 degrees. If the slop is taken up during a protective operation, the spindlelock can seize, causing a large amount of jerk on the power tool 100. Accordingly, the controller 200 may further adjust the bind-up detection algorithm to reduce or eliminate such jerk. For example, to avoid jerk, the controller 200 may allow the motor 280 to coast prior to performing a hard-braking operation when a bind-up condition is detected. In some embodiments, to avoid jerk, the controller 200 adjusts the braking speed of the motor 280 when a bind-up condition is detected.

As previously described, the power tool 100 may have a feature that reduces power to the motor 280 in the event of bind-up, such as via pulsing and/or reducing output current, power, or torque (throttling). This feature may thus change the motion and sensor response of the power tool 100 (e.g., becoming more or less sensitive to bind-up detection). Similar to the response for battery fetting and other protective features, the power tool 100 may change thresholds, parameters, or algorithms in response to its changing of its powered response characteristics (particularly throttling and pulsing, whether based on a discrete or continuous metric). Similarly, the change in response may be gradual and possibly reversible following the power reduction. Moreover, the act of throttling and/or pulsing may also warrant changing a threshold, parameter, or algorithm of the power tool 100 that dictates whether or not or how much to continue throttling and/or pulsing.

In some embodiments, forces experienced by the power tool 100 are great, and the controller 200 determines with high confidence that the power tool 100 is experiencing a bind-up condition. In other embodiments, changes with operation of the power tool 100 are gradual, and it may take a longer period of time for the controller 200 to detect a bind-up condition. Accordingly, the controller 200 may modify a protective operation dynamically, before or after detection of the bind-up, based on signals received from sensors coupled to the power tool 100. For example, an early, abrupt bind-up may quickly reach the first threshold or the second threshold used in previously-described protective operations. However, if the power tool 100 has had little motion upon detection of the bind-up condition, the controller 200 may coast or softly brake the motor 280 instead of a "hard" braking operation. Transitioning between braking operations (e.g., transitioning between a throttling operation of the motor 280, a coasting of the motor 280, a soft-braking operation, a regular braking operation, and a hard braking operation) may be discrete (e.g., an immediate transition) or continuous (for example, via PWM control between braking operations).

The controller 200 may select a default protective operation based on, for example, a swing (e.g., a speed and changing angle) of the power tool 100, an orientation of the power tool 100 (in one axis, in two axes, or in three axes), a total rotation of the power tool 100 from a neutral position, a presence of a side handle (such as the mechanical attachment), characteristics of a detected grip of a user, a mode of the power tool 100 (e.g., a hammer drilling mode versus a drilling mode), a characteristic of the battery pack 150 (e.g., an inertia of the battery pack 150, a remaining charge of the battery pack 150), a temperature of the battery pack 150, a temperature of the motor 280, whether a battery fetting event is detected, whether a nearby foreign object is detected, whether bracing of the power tool 100 is detected, a user setting (for example, a user input via an application, a dial or switch on the tool, or the like), an amount of backlash expected to be experienced, an engagement nature of a workpiece, or the like.

Thus, embodiments provided herein describe, among other things, systems and methods for adjusting a threshold, adjusting a control parameter, and/or switching an algorithm, used to determine a bind-up condition of a power tool or change the control response of the power tool used to determine a bind-up condition of a power tool. Various features and advantages are set forth in the following claims.

What is claimed is:

1. A power tool comprising:
a housing;
a motor within the housing;
a battery pack configured to provide current to the motor;
a motion sensor configured to sense rotational motion of the housing; and
an electronic controller connected to the motor, the battery pack, and the motion sensor, the electronic controller configured to:
determine, based on a characteristic of the battery pack, whether to decrease power provided to the motor,
adjust, in response to determining to decrease the power provided to the motor, a rotational motion threshold used to determine a bind-up event,
receive, from the motion sensor, a first signal indicative of rotational motion of the housing,
compare a value based on the first signal to the rotational motion threshold, and
initiate, in response to the value being greater than or equal to the rotational motion threshold, a first protective operation.

2. The power tool of claim 1, further comprising a second sensor configured to sense one selected from a group consisting of a current associated with the battery pack, a temperature of the battery pack, a voltage provided by the battery pack, a torque of the motor, and a speed of the motor.

3. The power tool of claim 2, wherein the electronic controller is further configured to:
receive, from the second sensor, a second signal indicative of the one selected from the group consisting of the current of the battery pack, the temperature of the battery pack, the voltage provided by the battery pack, the torque of the motor, and the speed of the motor,
compare a second value based on the second signal to a first operational threshold, and
determine, based on the comparison, to decrease the power provided to the motor.

4. The power tool of claim 1, wherein the first protective operation is a braking of the motor.

5. The power tool of claim 1, wherein the electronic controller is further configured to:
determine not to decrease power provided to the motor;
receive, from the motion sensor, a second signal indicative of rotational motion of the housing;
compare a second value based on the second signal to a second rotational motion threshold; and
initiate, in response to the second value being greater than or equal to the second rotational motion threshold, a second protective operation,
wherein the second protective operation is different from the first protective operation.

6. The power tool of claim 1, wherein, to adjust the rotational motion threshold, the electronic controller is configured to decrease the rotational motion threshold.

7. A method of adjusting a bind-up threshold of a power tool, the method comprising:
determining, based on a characteristic of a battery pack, whether to decrease power provided to a motor;
adjusting, in response to determining to decrease the power provided to the motor, a rotational motion threshold used to determine a bind-up event;
receiving, from a motion sensor, a first signal indicative of rotational motion of a power tool housing;
comparing a value based on the first signal to the rotational motion threshold; and
initiating, in response to the value being greater than or equal to the rotational motion threshold, a first protective operation.

8. The method of claim 7, further comprising:
receiving, from a second sensor, a second signal indicative of the one selected from the group consisting of a current of the battery pack, a temperature of the battery pack, a voltage provided by the battery pack, a torque of the motor, and a speed of the motor.

9. The method of claim 8, further comprising:
comparing a second value based on the second signal to a first operational threshold, and
determine, based on the comparison, to decrease the power provided to the motor.

10. The method of claim 7, wherein the first protective operation is a braking of the motor.

11. The method of claim 7, further comprising:
determining not to decrease power provided to the motor;
receiving, from the motion sensor, a second signal indicative of rotational motion of the power tool housing;
comparing a second value based on the second signal to a second rotational motion threshold; and
initiating, in response to the second value being greater than or equal to the second rotational motion threshold, a second protective operation,
wherein the second protective operation is different from the first protective operation.

12. The method of claim 7, wherein adjusting the rotational motion threshold includes decreasing the rotational motion threshold.

13. A power tool comprising:
a housing;
a driver configured to rotate about a working axis;
a motor within the housing and configured to drive the driver;
an input device configured to receive an input associated with a distance between the housing and an object;
a battery pack configured to provide current to the motor;
a motion sensor configured to sense rotational motion of the housing; and
an electronic controller connected to the motor, the input device, the battery pack, and the motion sensor, the electronic controller configured to:
receive, via the input device, the input associated with the distance between the housing and the object,
select a rotational motion threshold used to determine a bind-up event based on the distance between the housing and the object, wherein the object is in a contact path of the housing when the bind-up event occurs causing the housing to rotate around the working axis,
receive, from the motion sensor, a first signal indicative of rotational motion of the housing,
compare a value based on the first signal to the rotational motion threshold, and
initiate, in response to the value being greater than or equal to the rotational motion threshold, a protective operation.

14. The power tool of claim 13, wherein the input device is a proximity sensor.

15. The power tool of claim 14, wherein the proximity sensor is one selected from the group consisting of a light sensor, an ultrasound sensor, and an infrared sensor.

16. The power tool of claim 13, wherein the input device is configured to detect a tap of the housing of the power tool on the object to receive the input.

17. The power tool of claim 13, wherein the electronic controller is further configured to:
determine an offset angle between the power tool and the object;
determine whether the offset angle is approximately zero degrees; and
disable operation of the motor in response to the offset angle being approximately zero degrees.

18. The power tool of claim 13, wherein the electronic controller is further configured to:
determine an offset angle between the power tool and the object; and
reduce a maximum amount of power provided to the motor based on the offset angle.

19. The power tool of claim 13, further comprising a second sensor configured to sense a current provided to the motor, and wherein the electronic controller is further configured to:
receive, from the second sensor, a current signal indicative of the current provided to the motor;
generate an output based on the current signal;
compare the output to the rotational motion threshold; and
initiate, in response to the output being greater than or equal to the rotational motion threshold, the protective operation.

20. The power tool of claim 13, wherein the electronic controller is further configured to:
estimate a translational distance between the housing and the object based on the input; and
select the rotational motion threshold based on the translational distance.

* * * * *